UNITED STATES PATENT OFFICE.

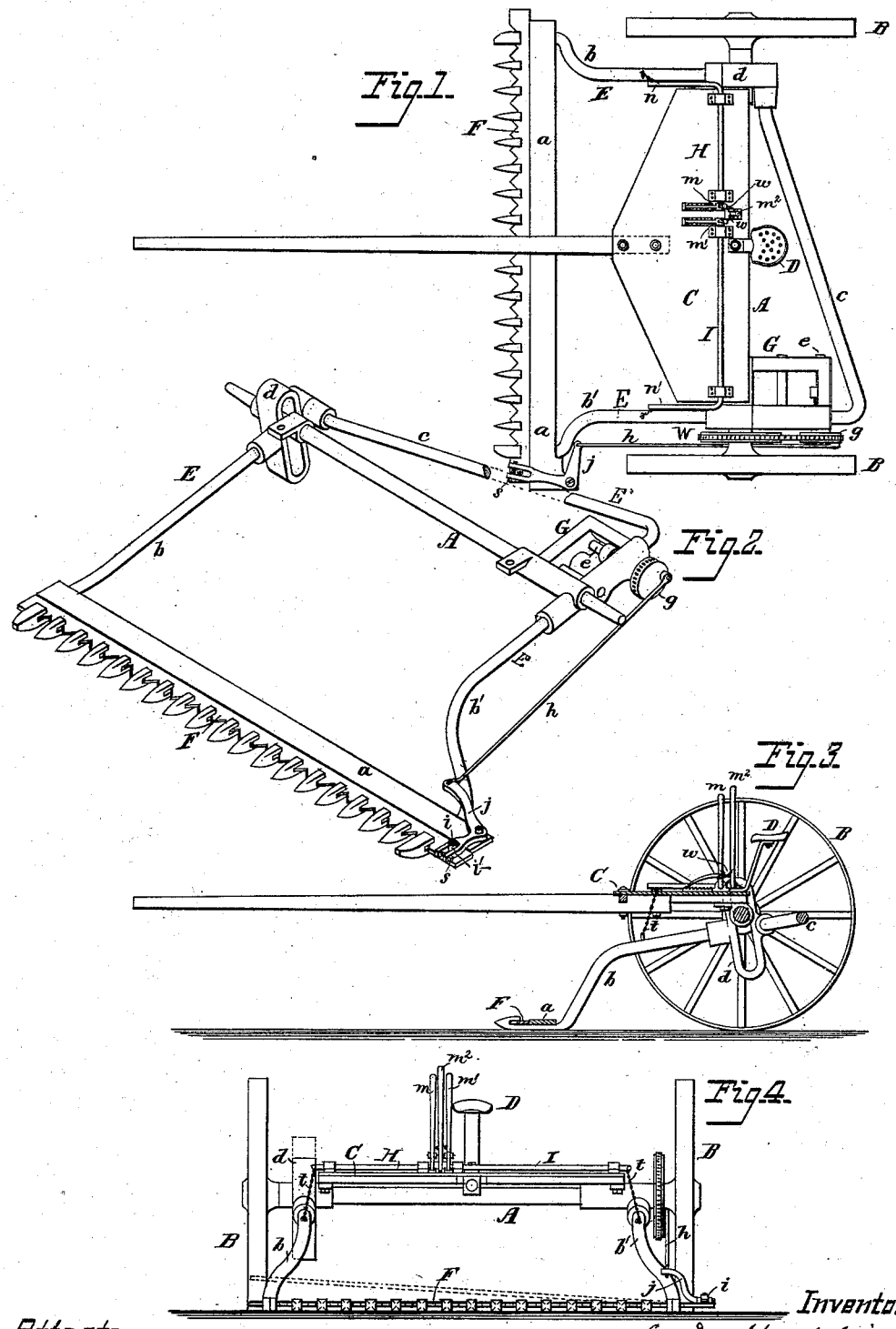

SAMUEL D. MADDIN, OF ST. PAUL, MINNESOTA.

HARVESTER.

SPECIFICATION forming part of Letters Patent No. 262,963, dated August 22, 1882.

Application filed May 17, 1882. (No model.)

*To all whom it may concern:*

Be it known that I, SAMUEL D. MADDIN, a citizen of the United States, and a resident of St. Paul, Ramsey county, Minnesota, have invented certain new and useful Improvements in Harvesters, of which the following is a specification.

My invention is a harvesting-machine in which the frame is flexibly connected to the axle, as fully described hereinafter, so as to swing thereon, and so that it may be raised or lowered at one side to bring the cutter-bar to any desired angle to the ground, while at all times maintaining a positive bearing of the frame upon the axle and securing a rigid support for the bar.

My invention further consists of certain details of construction, hereinafter fully set forth.

In the drawings, Figure 1 is a plan view of my improved harvester. Fig. 2 is a perspective view of the frame and axle. Fig. 3 is a sectional elevation, and Fig. 4 is a front elevation.

My improvements are adapted for use with harvesters in which there is either a front or rear draft, a front-draft harvester being shown in the drawings.

A is the axle.

B B are the wheels.

C is a platform supported by the axle, and supporting the standard of the driver's seat D.

E is the swinging frame that supports the cutter-bar F, the said frame consisting of a flat front bar, $a$, bent side bars, $b$ $b'$, a back bar, $c$, and a slotted piece, yoke, or link, $d$, to which the ends of the back bar and the side bar, $b$, are connected, as shown; but the link may be in one piece with the side and back bars.

The axle A extends through the link $d$, and on the opposite end of the axle swings a frame, G, through which extends the side bar $b'$, the bar rocking freely in the bearing thus afforded, but without sliding.

In the frame G, parallel to the axle A, turns a shaft, $e$, driven in any suitable manner from a pulley, W, on the axle, or secured to one of the wheels, and carrying a crank-wheel, $g$, to the wrist-pin of which is connected the inner end of a pitman, $h$, the outer end being jointed to one end of a bell-crank lever, $j$, pivoted to the cross-bar $a$. Into a slot in the lever $j$ extends a pin, $i$, upon the cutter-bar F, which is caused to reciprocate by the vibration of the lever, resulting from the revolution of the crank-wheel. Upon the pin $i$ turns freely a friction-sleeve, $i'$, and through the forked ends of the lever $j$ passes a screw, $s$, by which the ends may be brought together to take up lost motion resulting from wear.

In bearings on the platform C turn two shafts, H I, provided respectively with arms $n$ $n'$ and levers or handles $m$ $m'$, the arms being connected by chains or links $t$ with the side bars, $b$ $b'$, as shown, so that by drawing back either handle one side of the frame E will be elevated.

When the bar $a$ is parallel to an even or level surface the position of the frame E will be such that the link $d$ will extend to the same degree on opposite sides of the axle, so that this side of the frame can be raised or depressed by the movement of the lever $m$, the bar $b'$ turning freely in its bearings. When, therefore, in the progress of the machine it is brought over ground inclined downward toward the side bar $b$ the lever $m$ is moved forward, letting this side of the frame drop until the front bar is parallel to the ground, as in full lines, Fig. 4. When the ground inclines to the opposite side the backward movement of the lever $m$ raises the side $b$ and secures the desired position of the bar $a$, as in dotted lines, Fig. 4.

By the manipulation of a third lever, $m^2$, connected by chains $w$ to both levers $m$ $m'$, the entire frame may be lifted or depressed.

While such a flexible connection of the frame and axle is thus secured that the frame may be swung to bring its front bar to any desired angle at any required height from the ground, the frame has positive bearings upon the axle or supports at all times and on both sides, so that there is no play or lost motion, and the bar is supported rigidly, so that it cannot twist or sag.

I do not limit myself to the precise construction of parts described, as any bearings that will permit the swinging of the frame upon the axle, the rocking of the side bar $b'$ at right angles to the axle, and the vertical movements of the side bar $b$ will be effective in carrying out my improvement. For instance, a yoke may be substituted for the link $d$, and the side bar $b'$ may turn in a link swinging on the axle.

Any suitable elevating and lowering devices may be substituted for the shafts and levers.

The frame G, swinging on the axle and supporting the side of the main frame E, is also a convenient support for the crank-shaft $e$, which is maintained at the same distance from the axis of the driving-wheel W, whatever may be the angle to which the main frame is adjusted.

I claim—

1. The combination, in a harvesting-machine, of an axle supported by the wheels, and a cutter-bar frame, one side bar of which rocks in bearings on a frame swinging on the axle, while the other side bar is attached to a link or yoke through which the axle extends, substantially as set forth.

2. The combination, with the axle A, of a rigid frame, E, having side, front, and back bars and connections, whereby said frame may be swung on said axle or rocked in its bearings at one side while raised or lowered at the other upon the axle, substantially as set forth.

3. The combination of an axle, A, and frame E, rocking at one side in bearings supported by the axle, and provided at the other with a link through which the axle extends, a platform supported by the axle, and elevating appliances, as described, whereby the frame E may be raised, lowered, and tilted, substantially as specified.

4. The combination of the axle, frame E, the frame G, swinging on the axle and supporting the bearings of one side of the frame E, and the crank-shaft $e$, supported by said frame, pitman $h$, parallel to the wheel, crank-lever $j$, pivoted adjacent to the cutter-bar, and cutter-bar, substantially as set forth.

5. The combination of the axle, platform, frame G, frame E, provided with a link, $d$, and turning in bearings on the frame G, and shafts H and I, provided with levers $m$ $m'$, substantially as set forth.

In testimony whereof I have signed my name to this specification in the presence of two subscribing witnesses.

SAMUEL DOMINICK MADDIN.

Witnesses:
JOHN HENRY RANDALL,
EUGENIO ACKLAND JOHNSON, Jr.